United States Patent
Tyus

(10) Patent No.: US 6,675,690 B1
(45) Date of Patent: Jan. 13, 2004

(54) WORKTABLE FOR A BANDSAW

(76) Inventor: Jack Tyus, 562 Kelling Rd., Stanton, TN (US) 38069

( * ) Notice: Subject to any disclaimer, the term of this patent is extended or adjusted under 35 U.S.C. 154(b) by 0 days.

(21) Appl. No.: 10/226,558

(22) Filed: Aug. 23, 2002

(51) Int. Cl.[7] .............................................. B27B 13/04
(52) U.S. Cl. ..................... 83/788; 83/435.15; 83/436.6; 83/436.8; 144/286.5; 144/287
(58) Field of Search ......................... 83/788, 425, 794, 83/435.11, 431, 435, 435.15, 436.6, 436.75, 436.8, 437.2, 440; 144/286.1, 286.5, 287

(56) References Cited

U.S. PATENT DOCUMENTS

| | | | | |
|---|---|---|---|---|
| 1,886,321 A | * | 11/1932 | Walker | 83/166 |
| 2,445,676 A | | 7/1948 | Lasar | |
| 2,450,601 A | | 10/1948 | Lasar | |
| 2,835,287 A | | 5/1958 | Jones et al. | |
| 2,884,028 A | | 4/1959 | Bruch | |
| 3,240,244 A | * | 3/1966 | Biro | 83/421 |
| 3,508,590 A | * | 4/1970 | Sprague | 83/419 |
| 4,165,663 A | | 8/1979 | Tsutsui et al. | |
| 4,601,226 A | | 7/1986 | McClintock | |
| 4,603,613 A | * | 8/1986 | Wilson | 83/661 |
| 4,625,603 A | | 12/1986 | Vanden Brink | |
| 4,702,137 A | * | 10/1987 | Davidson et al. | 83/718 |
| 5,320,016 A | | 6/1994 | Spath et al. | |

* cited by examiner

Primary Examiner—Allan N. Shoap
Assistant Examiner—Phung Nguyen
(74) Attorney, Agent, or Firm—Walker, McKenzie & Walker, P.C.

(57) ABSTRACT

A worktable for a bandsaw. The worktable includes a support frame having a top frame portion and a bottom frame portion for resting on a support surface with the bottom portion of the bandsaw body fixedly attached to the bottom frame portion; a tabletop having a slot therein with the bandsaw blade extending therethrough; a plurality of support wheels mounted on the top frame portion of the support frame and rollably supporting the tabletop for allowing the tabletop to roll between a first position and a second position; and guide structure for guiding the tabletop as the tabletop is rolled between the first and second positions.

10 Claims, 5 Drawing Sheets

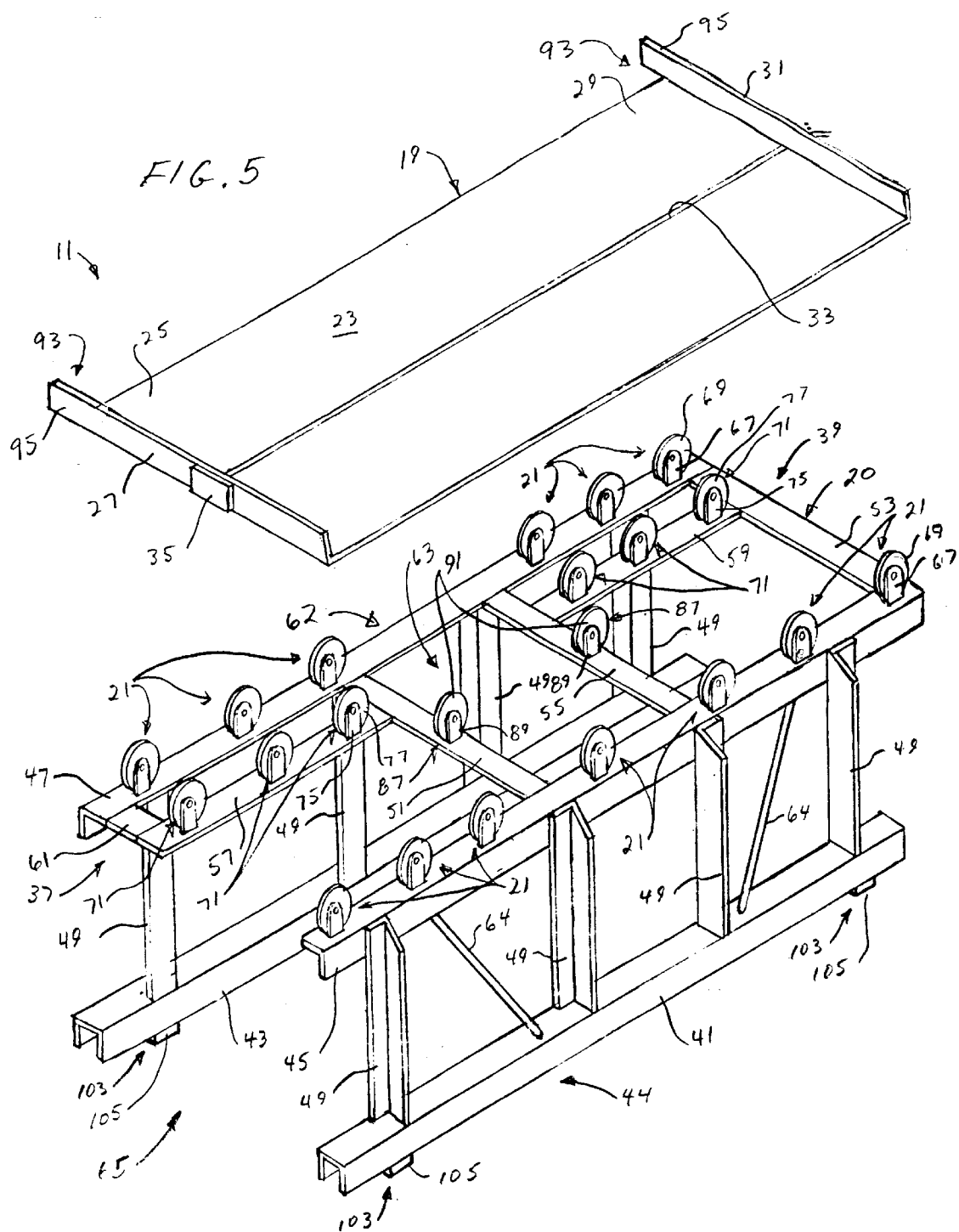

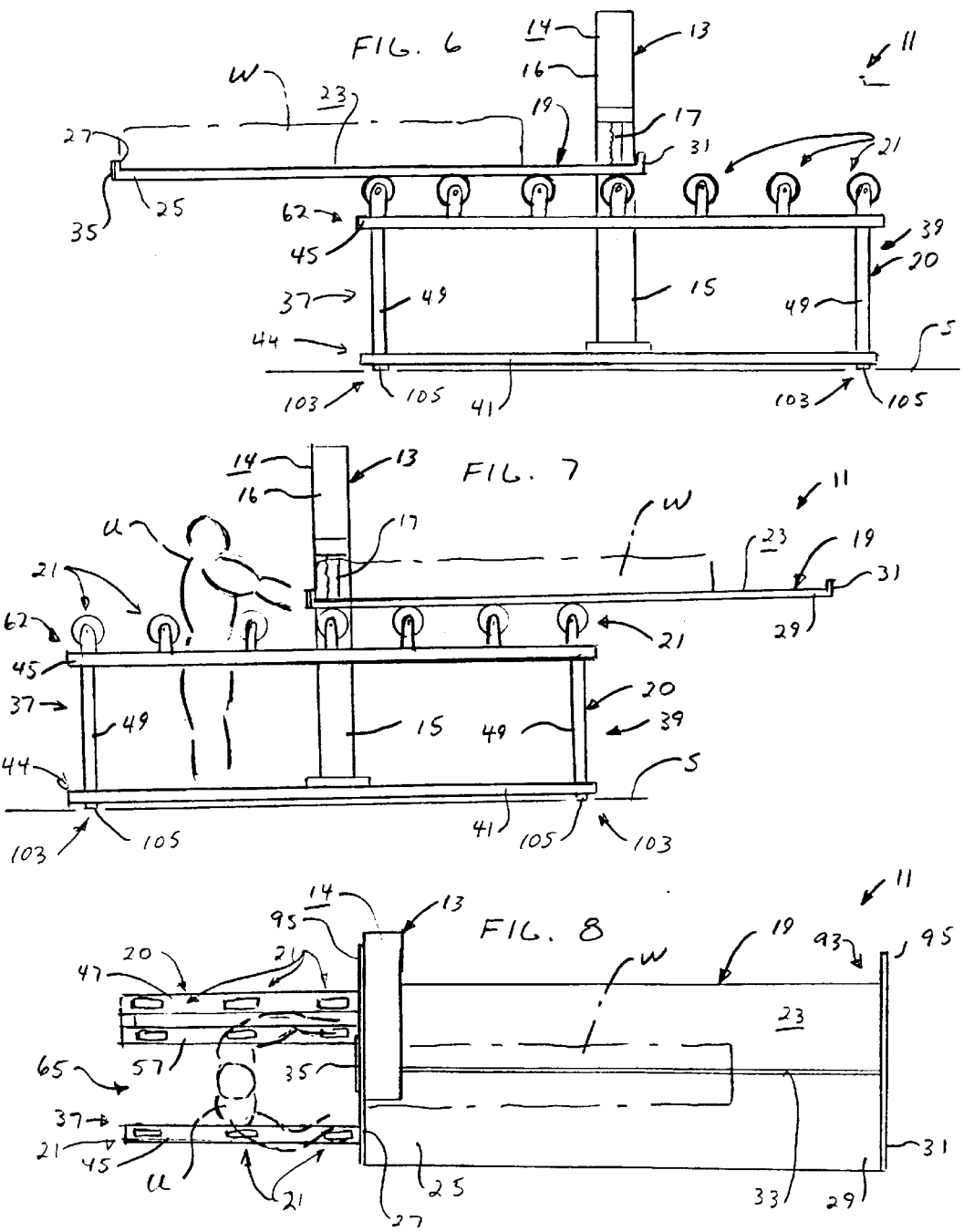

US 6,675,690 B1

WORKTABLE FOR A BANDSAW

BACKGROUND OF THE INVENTION

1. Field of the Invention

The present invention relates, in general, to bandsaws and, more specifically, to a bandsaw worktable that can roll between first and second positions to move a workpiece through the bandsaw blade.

2. Information Disclosure Statement

A preliminary patentability search conducted in class 83, subclasses 801, 716, 794, 435.11, 435.22, 437.1, 477.2 and 809 produced the following patents which appear to be relevant to the present invention.

Lasar, U.S. Pat. No. 2,445,676, issued Jul. 20, 1948, discloses a reciprocating work table for a bandsaw, especially adapted for the cutting of a piece of meat into a number of slices, wherein upon retractive movement, the worktable will shift laterally with respect to the saw blade.

Lasar, U.S. Pat. No. 2,450,601, issued Oct. 5, 1948, discloses a reciprocating table for an endless band meat cutting machine constructed in a manner to prevent the forces developed in cutting the meat from tipping the table out of its desired horizontal position.

Jones et al., U.S. Pat. No. 2,835,287, issued May 20, 1958, discloses a safety device for use with bandsaws and the like that includes a retractable guard partly surrounding the cutting blade, and a locking device preventing the table being moved towards the blade and having a releasing mechanism which can only be operated with two hands.

Bruch, U.S. Pat. No. 2,884,028, issued Apr. 28, 1959, discloses a stationary table for a meat and bone saw.

Tsutsui et al., U.S. Pat. No. 4,165,663, issued Aug. 28, 1979, discloses a vertical bandsaw having a hydraulic feed mechanism with a driving component movable in opposite directions in response to the application thereto of fluid pressure.

McClintock, U.S. Pat. No. 4,601,226, issued Jul. 22, 1986, discloses a radial arm saw having a slide table comprising a table top slidably mounted on a pair of guide rails and having a plurality of recesses in the top surface to receive dowel pins that serve as a fence.

Vandem Brink, U.S. Pat. No. 4,625,603, issued Dec. 2, 1986, discloses a vertical cutoff saw with feed rate control, including a load sensor to sense the relative horizontal force to provide an indication of band loading, and a variable speed drive responsive to the load sensor to maintain a desired band load.

Spath et al., U.S. Pat. No. 5,320,016, issued Jun. 14, 1994, discloses a vertical bandsaw adapted to permit miter cuts clear through a workpiece.

Nothing in the known prior art discloses or suggests the present invention. More specifically, nothing in the known prior art discloses or suggests a worktable including a support frame having a top frame portion and a bottom frame portion for resting on a support surface with the bottom portion of a bandsaw body fixedly attached to the bottom frame portion; a tabletop having a slot therein with the bandsaw blade extending therethrough; a plurality of support wheels mounted on the top frame portion of the support frame and rollably supporting the tabletop for allowing the tabletop to roll between a first position and a second position; and guide means for guiding the tabletop as the tabletop is rolled between the first and second positions.

BRIEF SUMMARY OF THE INVENTION

The present invention provides a worktable for a bandsaw. A basic concept of the present invention is to provide a worktable for a bandsaw with a movable tabletop to allow large workpieces up to, for example, 8 feet (243.84 centimeters) long and 16 inches (40.64 centimeters) in diameter to be easily cut.

The worktable of the present invention comprises, in general, a support frame having a top frame portion and a bottom frame portion for resting on a support surface with the bottom portion of a bandsaw body fixedly attached to the bottom frame portion; a tabletop having a slot therein with a bandsaw blade extending therethrough; a plurality of support wheels mounted on the top frame portion of the support frame and rollably supporting the tabletop for allowing the tabletop to roll between a first position and a second position; and guide means for guiding the tabletop as the tabletop is rolled between the first and second positions.

One object of the present invention is to provide a worktable for a bandsaw that has a movable tabletop.

Another object of the present invention is to provide such a worktable that has a relatively large tabletop, with, for example, a length of 9 feet (274.32 centimeters) and a width of 38 inches (14.96 centimeters).

Another object of the present invention is to provide such a worktable that has a support frame and a tabletop with a plurality of support castors and a plurality of guide casters between the support frame and tabletop.

Another object of the present invention is to provide such a worktable in which the tabletop, with the workpiece supported thereon, can be moved relative to the bandsaw blade either manually or hydraulically, etc.

Another object of the present invention is to provide such a worktable having adjustable table guides.

Another object of the present invention is to provide such a worktable in which the tabletop can be used for a workbench.

Another object of the present invention is to provide such a worktable that is portable and easy to assemble and disassemble.

BRIEF DESCRIPTION OF THE SEVERAL VIEWS OF THE DRAWINGS

FIG. 5 is an exploded perspective view of the worktable of the present invention.

FIG. 6 is a somewhat diagrammatic front elevational view of the worktable of FIG. 1 with the tabletop thereof shown in the first position.

FIG. 7 is a somewhat diagrammatic front elevational view of the worktable of FIG. 1 with the tabletop thereof shown in the second position and with the user of the worktable standing within the entrance opening of the support frame thereof.

FIG. 8 is a somewhat diagrammatic top plan view of the worktable of FIG. 1 with the tabletop thereof shown in the second position and with the user of the worktable standing within the entrance opening of the support frame thereof.

DETAILED DESCRIPTION OF THE INVENTION

Figure 1:
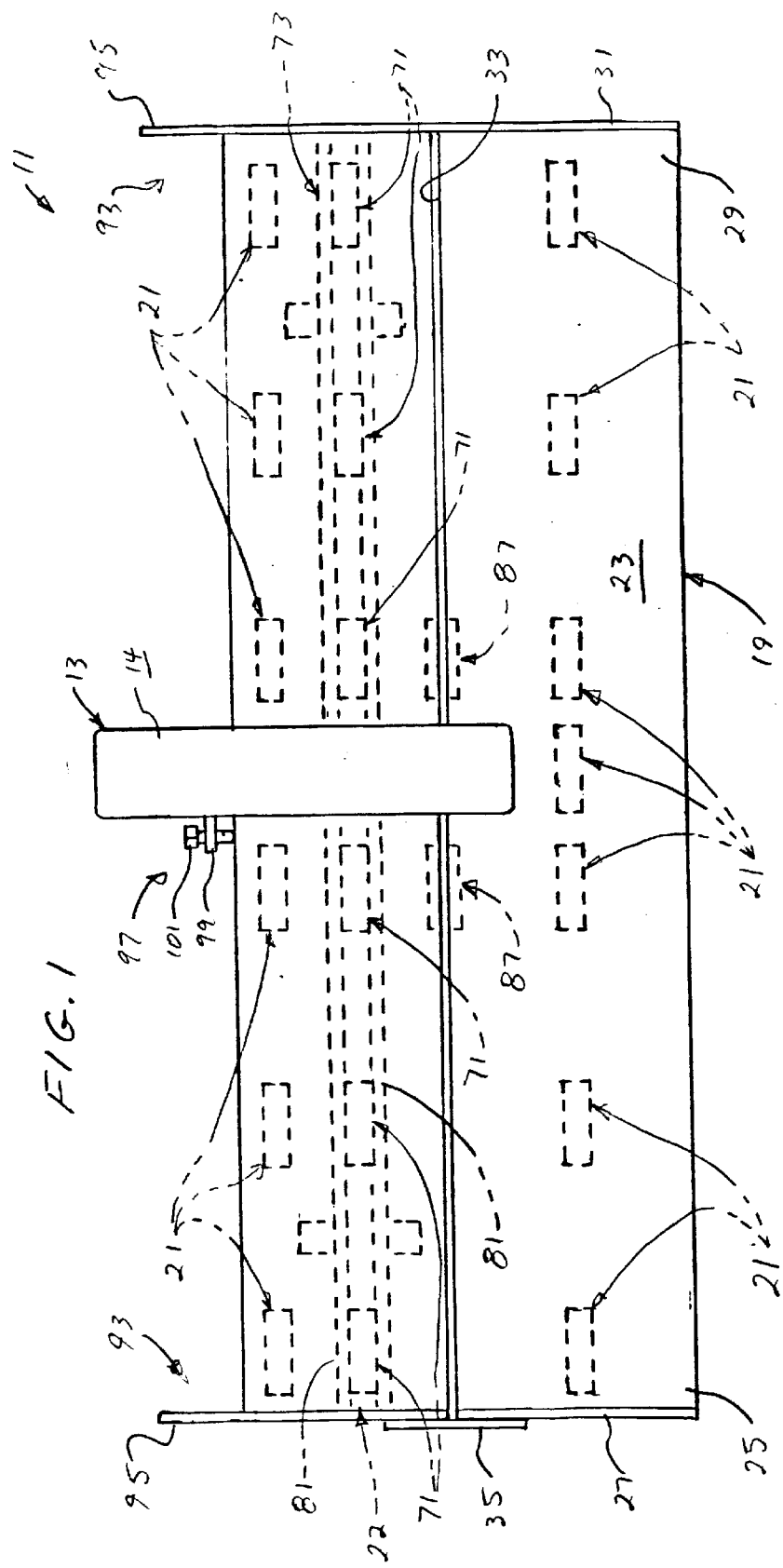
FIG. 1 is a top plan view of the worktable of the present invention, shown in combination with a bandsaw.
Figure 2:
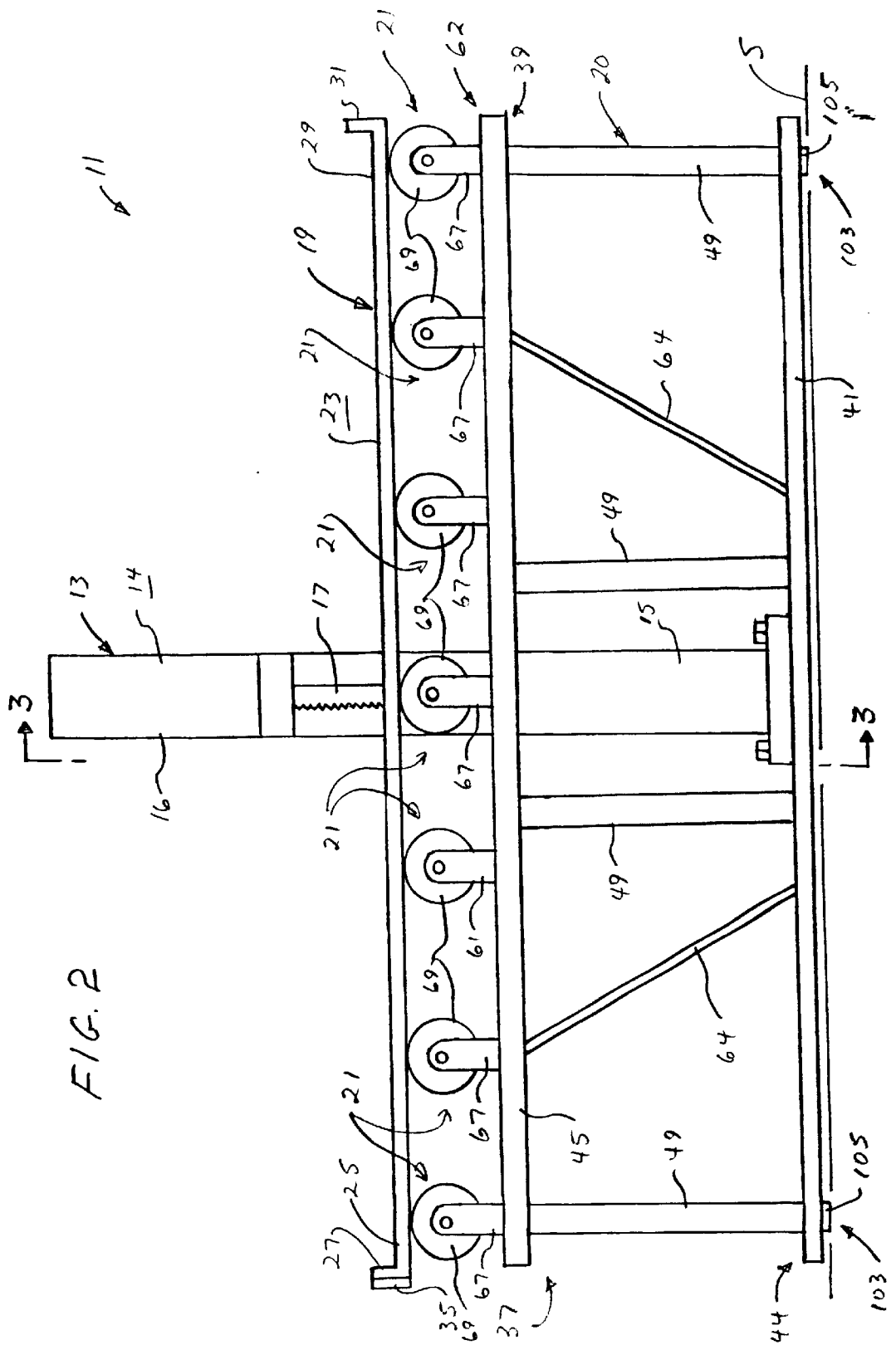
FIG. 2 is a front elevational view of the worktable of FIG. 1.
Figure 3:
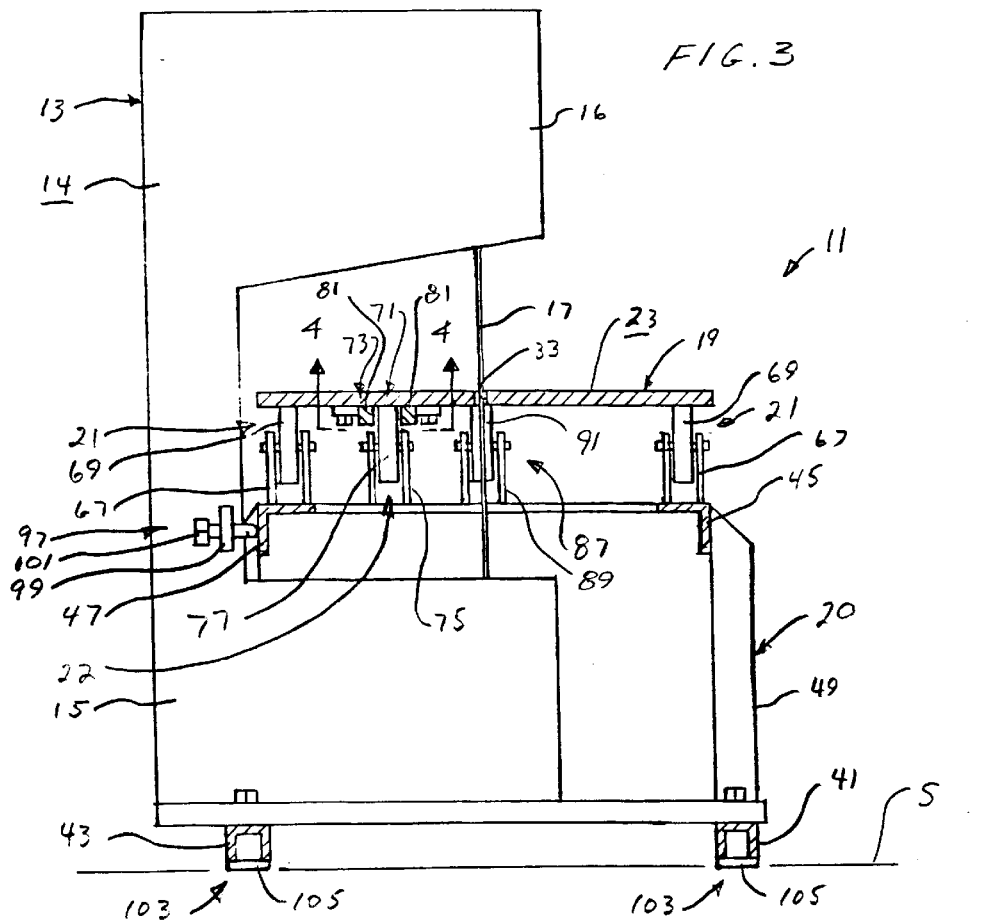
FIG. 3 is a sectional view as taken on line 3—3 of FIG. 2.
Figure 4:
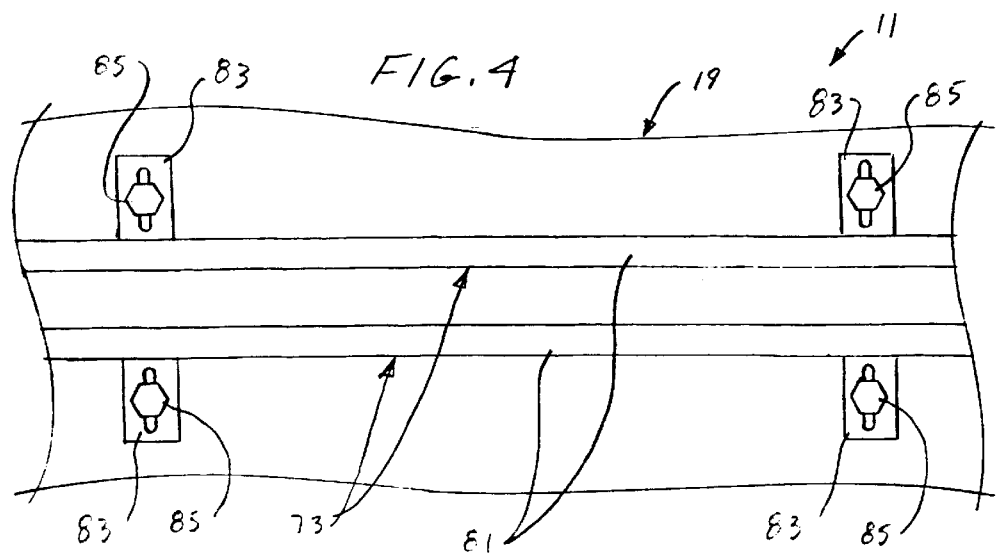
FIG. 4 is a plan view substantially as taken on line 4—4 of FIG. 3 on an enlarged scale relative to FIG. 3 and with portions thereof omitted for clarity.

A preferred embodiment of the worktable of the present invention is shown in FIGS. 1–8, and identified by the numeral 11. The worktable 11 is use with a typical bandsaw 13 including a bandsaw body 14 having a bottom portion 15 and a top portion 16, and a bandsaw or cutting blade 17 extending generally between the bottom and top portions 15, 16. The worktable 11 is used to support a workpiece W, such as a log or portion of a log, and to allow the workpiece W to be moved against the cutting blade 17 of the bandsaw 13. The worktable 11 is preferably designed to accommodate a workpiece W up to 8 feet (2.4 meters) long and 16 inches (40.64 centimeters) in diameter. The worktable 11 includes, in general, a tabletop 19, a support frame 20, a plurality of support wheels 21 mounted on the support frame 20 and rollably supporting the tabletop 19 for allowing the tabletop 19 to roll between a first position as shown in FIG. 6 and a second position as shown in FIGS. 7 and 8, and guide means 22 for guiding the tabletop 19 as the tabletop 19 is rolled between the first and second positions.

The tabletop 19 preferably has a substantially flat top or work surface 23 for receiving the workpiece W. The work surface 23 is preferably approximately 9 feet (2.7432 meters) long and approximately 38 inches (96.52centimeters) wide. The work surface 23 has a first or left end 25 with an upturned ridge or flange 27, and a second or right end 29 with an upturned ridge or flange 31 (left and right as viewed in FIG. 3). The work surface 23 and flanges 27, 31 are preferably constructed out of a single sheet of 3/16 inch (0.47625 centimeter) thick steel with the opposite ends bent at 90° to form the flanges 27, 31. A slot 33 is preferably cut or otherwise provided in the tabletop 19 for receiving the cutting blade 17 of the bandsaw 13. The slot 33 preferably extends through the flange 27 and lengthwise through the work surface 23 completely between the first and second ends 25, 29, but not through the flange 31. A plate 35 is preferably removably attached to the flange 27 over the slot 33 to selectively close the slot 33 through the flange 27 and help secure the opposite sides of the work surface 23 to one another. Screws (not shown) or the like may be used to removably attach the plate 35 to the flange 27.

The support frame 20 has a first or left end 37 and a second or right end 39 (left and right as viewed in FIG. 3) and preferably consists of an open skeletal framework. The open skeletal framework of the support frame 20 preferably includes a first or front elongated bottom rail 41 for resting on a support S such as a workshop floor, the ground, etc., a second or rear elongated bottom rail 43 for resting on the support S and extending parallel to and spaced rearwardly from the first or front elongated bottom rail 41.

Standard castors or the like could be provided between the bottom rails 41, 43 and the support S to allow the worktable 11 to be easily moved over the support S. The bottom rails 41, 43 coact to form a bottom frame portion 44 of the support frame 20. The open skeletal framework of the support frame 20 also preferably includes a first or front elongated top rail 45 extending parallel to and spaced upwardly from the first or front elongated bottom rail 41, a second or rear elongated top rail 47 extending parallel to and spaced upwardly from the second or rear elongated bottom rail 43, a plurality of elongated post 49 extending between the bottom rail 41 and top rail 45 and between the bottom rail 43 and top rail 47, a first or left cross bar 51 extending between the top rails 45, 47 at a point spaced inward from the first end 37 of the support frame 20 for reasons which will hereinafter become apparent, a second or right cross bar 53 extending between the top rails 45, 47 at the second end 39 of the support frame 20, and a third or intermediate cross bar 55 extending between the top rails 45, 47 at a point between the first and second cross bars 51, 53 (front, rear, left and right as viewed in FIG. 3).

The support frame 20 preferably includes a first intermediate upper rail 57 extending from the first end 37 of the support frame 20 to the first cross bar 51 parallel to the second elongated top rail 47, and a second intermediate upper rail 59 extending from the second cross bar 53 to the third cross bar 55 parallel to the second elongated top rail 47. A fourth cross bar 61 preferably extends between the first intermediate upper rail 57 and the second elongated top rail 47 at the first end 37 of the support frame 20.

The top rails 45, 47, cross bars 51, 53, 55, 61, and upper rails 57, 59 coact to form a top frame portion 62 of the support frame 20. An opening 63 is formed between the rails 45, 47 and the cross bars 51, 55 and defines a space for receiving the bandsaw 13 with the bottom portion 15 of the bandsaw body 14 being bolted or otherwise fixedly attached to the bottom frame portion 44, etc.

The various rails 41, 43, 45, 47, 57, 59, posts 49, and bars 51, 53, 55, 61 are preferably constructed from standard structural steel components such as angles, channels and bars, etc., cut to desired length, and welded or otherwise fixedly attached together to form a strong, integral unit as will now be apparent to those skilled in the art. Depending on the desired rigidity desired, the support frame 20 may include one or more stabilizing rods or bars 64 extending between various rails 41, 43, 45, 47, 57, 59, posts 49, and bars 51, 53, 55, 61, etc., to stabilize the support frame 20. The stabilizing bars 64 are also preferably constructed from standard structural steel components cut to desired length and welded or otherwise fixedly attached to other parts of the support frame 20, etc.

The first end 37 of the support frame 20 preferably has an entrance or inlet opening 65 extending from first end 37 of the support frame 20 toward the second end 39 of the support frame 20 and allowing a person using the worktable 11 to enter the entrance opening 65 when the tabletop 19 is rolled from the first position toward the second position. The entrance opening 65 thus defines a space for allowing the body of the user U of the worktable 11 to move directly adjacent the bandsaw 13 as shown diagrammatically in FIGS. 7 and 8. For example, there is no full cross bar across the first end 37 of the support frame 20, thereby forming or creating a mouth for the inlet opening 65.

Each support wheel 21 may consist of a typical caster or the like having a frame or base 67 positioned on the top side of the front or rear top rail 45, 47, and a wheel or roller 69 rotatably mounted by way of a axle or the like to the base 67. As clearly shown in FIG. 5, the worktable 11 may include a total of 13 support wheels 21, with six support wheels 21 mounted on the top side of the rear top rail 47 and seven support wheels 21 mounted on the top side of the front top rail 45.

The guide means 22 may include a plurality of guide wheels 71 mounted on the top frame portion 62 of the support frame 20, and guide track means 73 attached to the underside of the tabletop 19 for receiving the guide wheels 71. Each guide wheel 71 may also consist of a typical caster or the like having a frame or base 75 positioned on the top side of an intermediate upper rail 57, 59, and a wheel or roller 77 rotatably mounted by way of a axle or the like to the base 75. As clearly shown in FIG. 5, the worktable 11 may include a total of 6 guide wheels 71, with three guide wheels 71 mounted on the top side of the first intermediate upper rail 57 and three guide wheels 71 mounted on the top side of the second intermediate upper rail 59.

The guide track means 73 may include a pair of spaced apart elongated bars 81 fixedly attached to the underside of the tabletop 19 parallel to one another in a manner to straddle a portion of the wheel 77 of one or more guide wheels 71 to thereby coact with the guide wheels 71 to guide the tabletop 19 as the tabletop 19 is moved between the first and second positions, etc., as will now be apparent to those skilled in the art.

The bars 81 may be fixedly attached to the underside of the tabletop 19 by welding or the like. Preferably, however, the guide track means 73 is adjustable to allow fine tuning of the space between the bars 81, the distance between the bars 81 and the slot 33 in the tabletop 19, and the parallelism between the bars 81 and the slot 33, etc. For example, each bar 81 may have a plurality of slotted tabs 83 and may be attached to the underside of the tabletop 19 by a bolt 85 extending through each slotted tab 83 as clearly shown in FIGS. 3 and 4. The elongated bars 81 will also act to reinforce and strengthen the tabletop 19.

The worktable 11 preferably includes a plurality of slot support wheels 87 mounted on the top frame portion 62 of the support frame 20 beneath the slot 33 through the tabletop 19 to rollably support the tabletop 19 contiguous with the slot 33 through the tabletop 19 and adjacent the bandsaw blade 17. Each slot support wheel 87 may also consist of a typical caster or the like having a frame or base 89 positioned on the upper frame portion 62 of the support frame 20, and a wheel or roller 91 rotatably mounted by way of a axle or the like to the base 89.

As clearly shown in FIG. 5, the worktable 11 may include a total of 2 slot support wheels 87, with one slot support wheel 87 mounted on the top side of the first cross bar 51 and another slot support wheel 87 mounted on the top side of the intermediate cross bar 55. The support wheels 87 are preferably mounted in a position to straddle the slot 33 in the tabletop 19 when the tabletop 19 is rollably supported on the support frame 20 by the support wheels 21, etc. By straddling the slot 33 (i.e., with a portion of the wheel 91 of each support wheel 87 engaging a portion of the bottom of the tabletop 19 on opposite sides of the slot 33), the slot support wheels 87 will stabilize and securely support the tabletop 19 on opposite sides of the slot 33 as will now be apparent to those skilled in the art.

As will be understood by those skilled in the art, the guide wheels 71 and slot support wheels 87 coact with the support wheels 21 to rollably support the tabletop 19.

The worktable 11 preferably includes stop means 93 for preventing the tabletop 19 from moving past the first or second position. The stop means 93 may include a tab member 95 attached to and extending rearwardly from each end of the tabletop 19 in a position to contact a portion of the bandsaw body 14 when the tabletop 19 is in either the first or second position to prevent the tabletop 19 from being pushed past the respective first or second position. Each table member 95 may consist simply of metal structural members such as elongated bars or the like welded or otherwise fixedly, attached to the rear side of each upturned ridge or flange 27, 31 of the tabletop 19.

The worktable 11 preferably includes slot adjustment means 97 for allowing the location of the slot 33 of the tabletop 19 to be adjusted. The operation of the slot adjustment means 97 may be based on the flexibility and resiliency of the posts 49 of the support frame 20 to allow the upper end of the support frame 20, and thus the tabletop 19 and the slot 33, to move back and forth with respect to the bandsaw 13 to thereby move the slot 33 back and forth with respect to the cutting blade 17 of the bandsaw 13. Thus, the slot adjustment means 97 may include a tab or lug member 99 mounted on the bandsaw body 14 and a screw member 101 threadingly associated with the lug member 99 for being forced against a portion of the rear elongated top rail 47 of the upper frame portion 62 of the support frame 20 to cause the posts 49 to flex and allow the upper frame portion 62 to move back and forth as will now be apparent to those skilled in the art. A lug member 99 and associated screw member 101 may be located on opposite sides of the bandsaw body 14 if desired.

The worktable 11 preferably includes leveling means 103 for allowing the level of the tabletop 19 to be adjusted. The specific construction of the leveling means 103 may vary. For example, the leveling means 103 could include screw or wedge type height adjustments for each support wheel 21. However, the leveling means 103 could simply include adjustable feet 105 attached to opposite ends of the bottom rails 41, 43 of the support frame 20 to allow the height of opposite ends of the upper frame portion 62 to be raised or lowered, thereby allowing the level of the tabletop 19 to be adjusted as will now be apparent to those skilled in the art.

While the tabletop 19 may be easily manually moved between the first and second positions, the worktable 11 may include a motorized drive means (not shown) for moving the tabletop 19 between the first and second positions when desired. The drive means may include a hydraulic track or the like located between the bottom side of the tabletop 19 and the upper frame portion 62 of the support frame 20.

Although the present invention has been described and illustrated with respect to a preferred embodiment and a preferred use therefor, it is not to be so limited since modifications and changes can be made therein which are within the full intended scope of the invention.

What is claimed is:

1. A worktable for a bandsaw; said bandsaw including a bandsaw body having a bottom portion and a top portion, and including a bandsaw blade extending between said top and bottom portions of said bandsaw body; said worktable comprising:

(a) a support frame including a top frame portion and a bottom frame portion for resting on a support surface with said bottom portion of said bandsaw body fixedly attached to said bottom frame portion;

(b) a tabletop having a slot therein with said bandsaw blade extending therethrough;

(c) a plurality of support wheels mounted on said top frame portion of said support frame and rollably supporting said tabletop for allowing said tabletop to roll between a first position and a second position; and (d) guide means for guiding said tabletop as said tabletop is rolled between said first and second positions.

2. The worktable of claim 1 in which said support frame includes a first end and a second end and in which said first end of said support frame has an entrance opening extending from said first end of said support frame toward said second end of said support frame and allowing a person using said worktable to enter said entrance opening when said tabletop is rolled from said first position toward said second position.

3. The worktable of claim 1 in which is included a plurality of slot support wheels mounted on said top frame portion of said support frame beneath said slot through said tabletop to rollably support said tabletop contiguous with said slot through said tabletop and adjacent said bandsaw blade.

4. The worktable of claim 1 in which said guide means includes a plurality of guide wheels mounted on said top frame portion of said support frame.

5. The worktable of claim 4 in which said guide means includes guide track means attached to said tabletop for receiving said guide wheels.

6. The worktable of claim 5 in which said guide track means is adjustable.

7. The worktable of claim 1 in which is included stop means for preventing said tabletop from moving past said first or second position.

8. The worktable of claim 1 in which is included slot adjustment means for allowing the location of said slot of said tabletop to be adjusted.

9. The worktable of claim 1 in which is included leveling means for allowing the level of said tabletop to be adjusted.

10. The worktable of claim 1 in which said support frame includes stabilizing rods to stabilize said support frame.

* * * * *